Feb. 8, 1966     H. F. ROSECRANS     3,234,041
METHOD OF APPLYING BINDER TO POROUS FIBROUS GLASS MATS
Filed Jan. 29, 1960     2 Sheets-Sheet 1
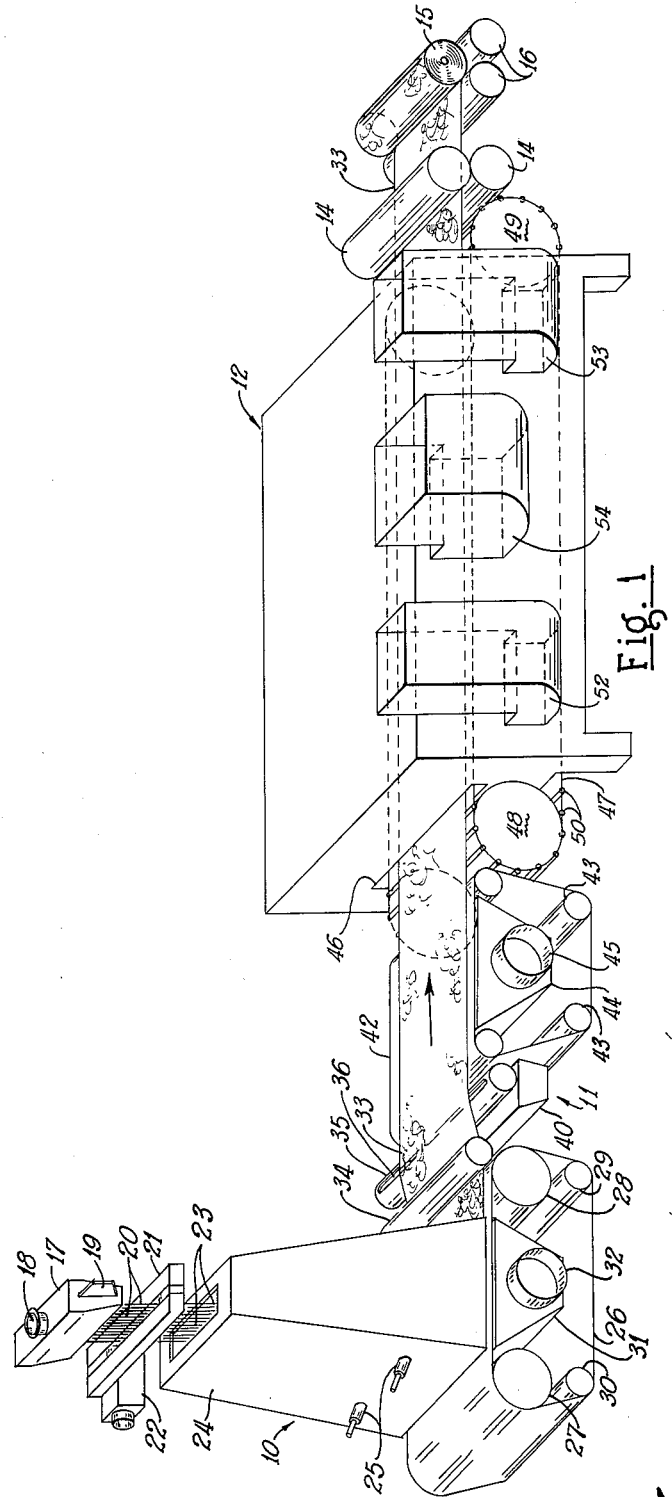
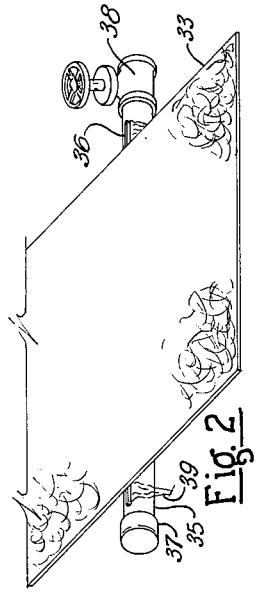
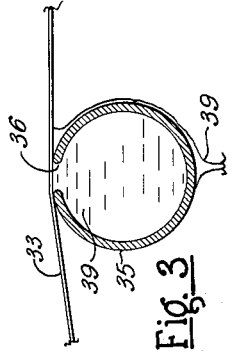
INVENTOR.
HAROLD F. ROSECRANS
BY
ATTORNEYS Feb. 8, 1966  H. F. ROSECRANS  3,234,041
METHOD OF APPLYING BINDER TO POROUS FIBROUS GLASS MATS
Filed Jan. 29, 1960  2 Sheets-Sheet 2

INVENTOR.
HAROLD F. ROSECRANS
BY
*Starlin & Overman*
ATTORNEYS

3,234,041
METHOD OF APPLYING BINDER TO POROUS FIBROUS GLASS MATS
Harold F. Rosecrans, Newark, Ohio, assignor to Owens-Corning Fiberglas Corporation, a corporation of Delaware
Filed Jan. 29, 1960, Ser. No. 5,391
2 Claims. (Cl. 117—102)

This invention relates particularly to a method and apparatus for applying a binder or some other impregnant material to mats of fibrous glass, but is also adaptable for coating or saturating mats or fabrics composed of other mineral or organic fibers.

As the invention is of special value in relation to fibrous glass mats in thicknesses from ten to seventy mils, the description and disclosure presented herein will be directed to the treating of such fibrous glass products.

These thin, pliable and porous sheets of bonded glass fibers first proved of value in batteries as inert retainers and separators between the positive and negative plates. Another early use, in a heavier form, was as underground pipe wrap. For these and other industrial uses uniformity in strength and porosity are generally important. The latter characteristic permits even impregnation by coating materials which may be applied over the mats and thorough saturation of the mats by plastic compounds which is very desirable when the mats are combined with plastics in molded or laminated products.

Mats of glass fibers in thicknesses below thirty-five mils are utilized in providing smooth surfaces and even distribution of color on plastic trays and similar molded articles with flat or gently curving contours. The fibrous pattern of these thinner mats also presents a very decorative effect when light is cast through the mats as in lamp shades and screens. Among the many additional applications of these glass sheets are crack-coverings, backing of wall paper, and as surfacing layers for various panels and blankets of fibrous glass having a coarser or more open fibrous structure.

It may be realized from the above that for functional and decorative purposes an even porosity throughout the full area of the bonded mat is frequently essential, and that a smooth, neat surface without blemishes is quite necessary from an appearance standpoint.

In the conventional creation of these mats, fibers are collected upon a conveyor in a thin, flat, continuous web in widths between thirty and fifty-four inches. This web may be initially integrated by a limited application of a binder or some other cohesion-promoting composition and by being passed beneatth a flattening roller.

To impregnate the mat with the principal binder or size, it has been the practice to run the mat down through a bath of the coating material held in a tank, or to drench the mat under a downward flow of the impregnant.

Various difficulties have been involved in these prior procedures. The dip method is inclined to load the mat with more binder than desired and the removal of the excess is troublesome. Both procedures result in larger particles of both foreign substances and binder material being caught or screened off upon the upper surface of the mat. Then, too, the binder material is exposed to the atmosphere before reaching the mat and may be easily contaminated. This exposure also increases evaporation which changes the concentration of the solid content and may precipitate or coagulate solid particles in closely balanced solutions, emulsions or suspensions.

The downward flow of the second method supplemented by other conditions associated therewith also is apt to cause uneven distribution of the binder planarly, and concentration of the binder in the upper surface of the mat.

The deficiencies in the binder distribution secured through these prior methods are more noticeable where heavier-bodied binders are employed to create mats with a higher percentage of the binder constituent. The amount of binder in the final product generally runs between seven and forty-two percent by weight. It is then in connection with mats with the binder percentage in the upper half of this range, when unsatisfactory results are most likely to be experienced. However, the practice of this invention is intended to insure improved results in the production of mats of various thicknesses, and impregnated with differing proportions of a binder component.

Generally, it is an object of this invention to provide a method and apparatus for impregnating fibrous mats with a binder or size in a manner whereby the distribution of the impregnant is consistently uniform in nature.

Another object is the provision of a mat impregnating method and apparatus which avoids the deposit upon the surface of the mat of disfiguring particles of foreign substances or of the binder material.

A further object of the invention is the production of bonded mats of attractive appearance and with improved capabilities, due to uniform porosity, for subsequent processing.

These and other objects and advantages of the invention are attained principally by thrusting the binder upwardly into and through the mat from a source in immediate contact with the mat. The preferred method of accomplishing this action is by feeding the binder under pressure into a tube with a slot discharge opening along its upper portion and passing the mat in closing relation over the slot while the binder is forced therefrom.

Other supplemental features, as well as modifications in the preferred method and apparatus, will be described hereafter with reference made to the accompanying drawings in which:

FIGURE 1 is a perspective, schematic view of a mat production line incorporating apparatus adapted for practicing this invention;

FIGURE 2 is an enlarged, fragmentary perspective view showing a mat passing over the slotted impregnating tube;

FIGURE 3 is a further enlarged, cross section of the mat and tube of FIGURE 2;

Figure 4:
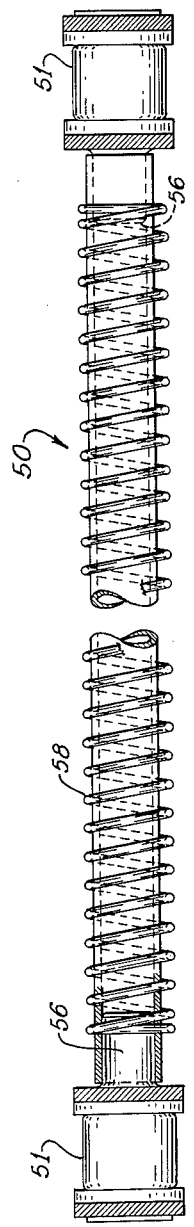
FIGURE 4 is a large scale side elevation of one form of conveyor bar which may be utilized to better realize the full benefits of this invention.
Figure 5:
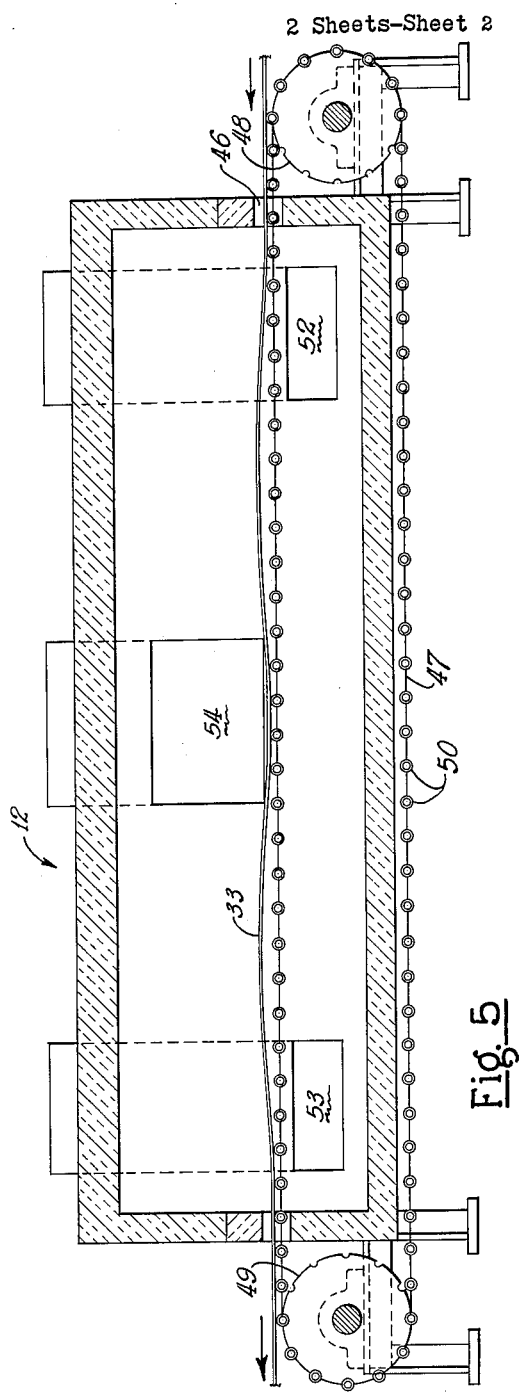
FIGURE 5 is a longitudinal, vertical section through the oven shown more schematically in the production line of FIGURE 1.

Referring to the drawings in more detail, the production line for fibrous glass mat illustrated in FIGURE 1 starts with the fiber forming and collecting apparatus 10. This is followed by the binder applying section 11 and the oven 12. Beyond the exit of the oven are shown a pair of ironing rollers 14 and a roll 15 of finished mat on the wind-up rollers 16.

The fiber forming unit 10 includes a glass melting furnace 17. Since a comparatively small quantity of fibers are utilized in producing a mat of the type involved, the capacity of the furnace 17 need not be very large. In this instance, the furnace is adapted to receive a glass supply in the form of marbles which are delivered into the furnace through the entry nipple 18.

The furnace is preferably heated by electrodes, terminals of which are indicated at 19. Threads of molten glass 20. issue from a bushing in the base of the furnace 17 and are attenuated into fine fibers by the blast of air or steam discharged from the manifold 21. A blower such as 22 may be utilized in supplying air for this purpose. The fairly long fibers 23 thus created are delivered into the forming hood 24. To help scatter the fibers uniformly crosswise within the hood, oscillating vanes may be placed in the upper part of the hood in the path of the descending fibers.

To provide coherence to the fibers in the thin web in which they are deposited at the bottom of the hood, a primary binder or cohesion-inducing chemical may be intermixed with the falling fibers by the spray nozzles 25. The foraminous belt conveyor 26 upon which the fibers collect is mounted for travel around a series of drums 27, 28, 29, and 30.

In order to further facilitate the evenly-distributed collection of the fibers upon the conveyor 26, air is drawn down through this air pervious conveyor into the suction chamber 31 by a suitable blower attached to the outlet 32. The fibrous mat 33 thus formed proceeds on conveyor 26 beneath the flattening roll 34. This effects a preliminary consolidation of the mat.

The mat then travels over the coating tube 35, and in so doing covers at least the center section of the opening slot 36 along the upper edge of the tube. This tube is preferably composed of stainless steel which stands up well under the wearing action of the passing web or mat and is also resistant to corrosive elements in binder compositions. The tube may have a diameter of two and one-quarter inches with a slot one-half inch in width.

As illustrated in FIGURE 2, the tube 35 has a cap 37 on one end and a supply control valve 38 at the other. The pressure feed of the binder solution or suspension 39 may be provided by a pump or simply be the head pressure in an open stand pipe. The material is delivered into the stand pipe by gravity or pressure, but in either case the supply rate is carefully controlled.

The binder may be one of many different compositions including suspensions, emulsions, or solutions of starch, or resins of polyester, furfural, polystyrene, and neoprene.

In issuing from the slot 36, the binder is forced into and through the mat passing closely thereover. The excess reaching the upper surface of the mat drains back down through the mat into the drain trough 40. This receptacle also receives binder that flows from the uncovered ends of the slot 36. By allowing the binder to flow from these open ends, the pressure of the discharge is held at a low stage which is usually most effective.

Should higher pressures be desirable, these open ends of the slot may be covered, and if necessary, additional pressure may be applied in supplying the binder to the tube 35. This forced flow of the binder in direct contact with the mat introduces the binder material uniformly throughout the full area of the mat. It should be noted that the binder is forced upwardly through the mat and then flows downwardly by gravity back through the mat thus subjecting the mat to two impregnating actions.

The bordering edges of the slot are preferably rounded. This with the curvature of the tube permits a mat to ride smoothly over the slot.

Where the binder is allowed to flow down over a mat as in prior apparatus, the binder may channel itself along certain paths due to the chemical affinity or the more easily wettable characteristic of sections of the mat. Through this coursing action, lack of an even saturation will result. Forceful upward projection, as in the subject apparatus, avoids this selective action.

Also, when applied from below large particles of whatever origin are filtered on the lower side of the mat and are inclined to drop by gravity therefrom after the mat goes beyond the tube 35. This separation is preferably facilitated by downward air movement.

Another advantage of the subject arrangement, wherein the mat travels directly over and in sealing relation with the slot is that the container for the binder supply, which in this case is the tube, is kept substantially covered, and stray fibers or other foreign materials are prevented from collecting and closing the outlet from the supply or from contaminating the binder material therein. The mat depressing action of the flattening roll 34 assists in holding the mat against the slot 36.

Any extra binder material inclined to remain on the upper surface of the mat is drawn downwardly in the mat by the action of air pulled through the foraminous conveyor 42. This air movement also helps to remove larger particles caught on the underside of the mat.

Conveyor 42 is mounted on a series of drums 43. Air is forced downwardly through the conveyor into the chamber 44 and out air exit connection 45 by a suitable exhaust blower. The mat 33 proceeds from conveyor 42 through inlet 46 into the oven 12.

The oven conveyor 47 runs between pairs of sprockets 48 and 49. The cross bars 50 of the conveyor are spaced about five inches apart. These bars are secured at their ends to the conveyor chains 51. In this particular embodiment, heated air is supplied to the oven through air inlets 52 and 53. This air moves upwardly to pass through the mat 33 to reach the air outlet 54.

Preferably, the temperature in the first part of the oven is held at a point to rapidly volatilize the liquid vehicle of the binder material. This initial temperature may be as high as eight hundred and fifty degrees Fahrenheit for a starch-type of binder. The temperature in the final section of the oven is reduced to that required for curing, without overheating, the solid component of the binder and may for instance be in the neighborhood of four hundred and twenty degrees. The two sections of the oven are normally separated by an insulating partition.

In order that the binder of the mat be cured uniformly it is desirable to limit its contact with the conveyor 47. This is due to the fact that elements of the conveyor in touch with the mat are apt to draw heat to or from the adjacent mat areas and thus alter the curing rate. The reduction of contact may be accomplished by having the air velocity high enough to actually lift the mat somewhat above the conveyor. The upward air movement also is advantageous in discouraging too much migration of the binder to the lower side of the mat.

Another arrangement which minimizes the contact between the conveyor and the mat is the mounting of springs over the bars of the conveyor. Such an assembly is illustrated in FIGURE 4. As there shown a bar 50 of the conveyor is mounted for independent rotation upon studs 56 projecting inwardly from the conveyor chains 51. A close fitting coil spring 58 is mounted snugly over the bar 50. In order to avoid leading the mat off the conveyor, the springs 58 should be wound in opposite directions on alternate bars. As may be realized, a mat riding on a bar equipped with a spring such as 58 has only periodic point contact therewith instead of a line contact along the full length of the bar.

After leaving the oven 12, the mat passes between the heated calender rolls 14 which iron out the mat, flattening and further curing any heavy spots of binder. The mat is then wound on the wind-up rollers 16 into a roll 15 for storage and shipment. The conventional production line would have edge trimming discs and a transverse knife to cut the mat into the desired lengths. These and other standard supplemental elements have not been included in this disclosure.

The embodiment of the invention here disclosed is a preferred form and one found to produce bonded mats of superior quality according to the objects of the invention.

Modifications which may be made therein without departing from the spirit of the invention and the scope of the appended claims include a slot dimensioned relative to the width of the mat to be completely covered thereby, a series of closely aligned holes in place of the slot, and forcefully projecting a sheet of binder upwardly against a mat traveling in spaced relation above the tube or other binder projecting structure.

The term "binder," as employed in the description and claims, is intended to cover various fluid materials with which a mat may be impregnated including sizes, protective coatings, fillers, and materials to improve special characteristics, such as stiffness, flexibility, strength or fire retarding.

Likewise, "mat" should be considered a general term to be interpreted as encompassing felted, woven and unwoven fibrous products.

I claim:

1. A method of applying binder uniformly through a continuous, porous fibrous glass mat, said mat being resistant to penetration and wetting by a fluid binder, which comprises transporting the mat in a horizontal plane and projecting upwardly a sheet of fluid binder crosswise against the underside of the moving mat with sufficient force and in sufficient volume that an appreciable amount of fluid binder is first forced up through the mat and the mat being thus wetted, the fluid binder forced therethrough then returns down through the mat by gravity thus causing fluid binder to pass through the mat in both directions for a thorough impregnation thereof.

2. A method according to claim 1 in which a flow of air is directed against the upper surface of the mat to facilitate the return down through the mat of the fluid binder.

References Cited by the Examiner

UNITED STATES PATENTS

| | | | |
|---|---|---|---|
| 1,154,560 | 9/1915 | Bryant | 34—156 |
| 1,240,625 | 9/1917 | Taylor | 118—401 |
| 1,361,932 | 12/1920 | Van Avermaete | 118—419 XR |
| 1,391,281 | 9/1921 | Snyder | 118—407 |
| 1,447,648 | 3/1923 | Deulin | 198—202 X |
| 1,469,048 | 9/1923 | Nelson | 34—155 |
| 1,678,925 | 7/1928 | Tackaberry | 271—2.6 |
| 1,728,471 | 9/1929 | Batring | 118—415 |
| 1,851,538 | 3/1932 | Day et al. | 118—415 XR |
| 1,950,351 | 3/1934 | Clark et al. | 162—266 X |
| 1,951,004 | 3/1934 | Willis | 117 |
| 2,183,298 | 12/1939 | Offen | 34—155 |
| 2,193,263 | 3/1940 | Avery | 117 |
| 2,271,347 | 1/1942 | Runals | 34—155 |
| 2,371,871 | 3/1945 | Burckhardt | 118—401 |
| 2,389,586 | 11/1945 | Andrews | 34—156 |
| 2,462,380 | 2/1949 | Gautreau | 34—156 |
| 2,747,583 | 5/1956 | Frankenburg et al. | 34—155 |
| 2,770,216 | 11/1956 | Schock | 118—325 X |
| 2,787,571 | 4/1957 | Miller | 117—140 X |
| 2,806,694 | 9/1957 | Penman | 226—18 |
| 3,096,161 | 7/1963 | Morrison et al. | 34—155 |

WILLIAM D. MARTIN, *Primary Examiner.*

JOSEPH B. SPENCER, RICHARD D. NEVIUS, *Examiners.*